(12) United States Patent
Rosa et al.

(10) Patent No.: US 10,084,861 B2
(45) Date of Patent: Sep. 25, 2018

(54) SYSTEMS AND METHODS FOR MANAGING RESOURCES IN NETWORKED ENVIRONMENT

(71) Applicant: NETAPP, INC., Sunnyvale, CA (US)

(72) Inventors: Francisco Jose Assis Rosa, Sudbury, MA (US); Iti Behari, Watertown, MA (US); Michael Edward Stapp, Westford, MA (US); Yarom Gabay, Newton, MA (US)

(73) Assignee: NETAPP, INC., Sunnyvale, CA (US)

( * ) Notice: Subject to any disclaimer, the term of this patent is extended or adjusted under 35 U.S.C. 154(b) by 252 days.

(21) Appl. No.: 15/057,378

(22) Filed: Mar. 1, 2016

(65) Prior Publication Data

US 2017/0257433 A1    Sep. 7, 2017

(51) Int. Cl.
*G06F 15/16* (2006.01)
*H04L 29/08* (2006.01)
*H04L 29/06* (2006.01)

(52) U.S. Cl.
CPC .... *H04L 67/1097* (2013.01); *H04L 29/08072* (2013.01); *H04L 29/06* (2013.01)

(58) Field of Classification Search
CPC ......... H04L 29/08072; G06F 17/30073; G06F 17/30321
USPC ................... 709/220, 224, 228, 232; 706/47
See application file for complete search history.

(56) References Cited

U.S. PATENT DOCUMENTS

| | | | | |
|---|---|---|---|---|
| 5,724,575 A | * | 3/1998 | Hoover | G06F 17/30424 |
| 6,013,154 A | * | 1/2000 | Thomas-Cote | B42F 21/04 |
| | | | | 156/230 |
| 7,133,870 B1 | * | 11/2006 | Tripp | G06F 17/30613 |
| | | | | 707/723 |
| 7,562,770 B1 | * | 7/2009 | Roque | B65D 51/2892 |
| | | | | 206/219 |
| 8,280,859 B2 | * | 10/2012 | Anglin | G06F 17/30162 |
| | | | | 707/640 |
| 8,959,067 B1 | * | 2/2015 | Patiejunas | G06F 17/30377 |
| | | | | 707/696 |
| 9,471,665 B2 | * | 10/2016 | Snell | G06F 17/30607 |
| 9,767,179 B2 | * | 9/2017 | Grignon | G06F 17/30589 |
| 2007/0100967 A1 | * | 5/2007 | Smith | G06F 8/20 |
| | | | | 709/219 |
| 2007/0288247 A1 | * | 12/2007 | Mackay | G06Q 10/00 |
| | | | | 705/1.1 |

(Continued)

*Primary Examiner* — Khanh Dinh
(74) *Attorney, Agent, or Firm* — Klein, O'Neill & Singh, LLP

(57) ABSTRACT

Methods and systems for a networked storage environment are provided. An object index for storing object identifiers is generated for uniquely identifying a plurality of resources represented by a plurality of objects for providing storage services in a networked storage environment. The object index configured to maintain relationship information between the plurality of objects. In response to a request for information regarding a resource received by an application programming interface (API) module; object identifiers from the object index are obtained to respond to the request, where the object identifiers identify a requested object and a related object whose information is stored at the object index. Then configuration information and performance data for the requested object and the related object are obtained from a storage device and provided to the API module.

20 Claims, 15 Drawing Sheets

(56) References Cited

U.S. PATENT DOCUMENTS

| | | | |
|---|---|---|---|
| 2012/0191716 A1* | 7/2012 | Omoigui | H01L 27/1463 707/740 |
| 2013/0232153 A1* | 9/2013 | Dhuse | G06F 17/30321 707/741 |
| 2015/0161184 A1* | 6/2015 | Patiejunas | G06F 17/30377 707/673 |

* cited by examiner

SYSTEMS AND METHODS FOR MANAGING RESOURCES IN NETWORKED ENVIRONMENT

TECHNICAL FIELD

The present disclosure relates to networked storage environments and more particularly, to managing resources used in the networked storage environments.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

Networked storage systems are used extensively in NAS, SAN and virtual environments. The infrastructure for such storage systems use various components/resources, for example, switches, storage devices and others. Continuous efforts are being made to efficiently manage the resources and information regarding the resources.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

Methods and systems for a networked storage environment are provided. An object index for storing object identifiers is generated for uniquely identifying a plurality of resources represented by a plurality of objects for providing storage services in a networked storage environment. The object index is configured to maintain relationship information between the plurality of objects. In response to a request for information regarding a resource received by an application programming interface (API) module; object identifiers from the object index are obtained, where the object identifiers identify a requested object and a related object whose information is stored at the object index. Then configuration information and performance data for the requested object and the related object are obtained from a storage device and provided to the API module.

Figure 1A:
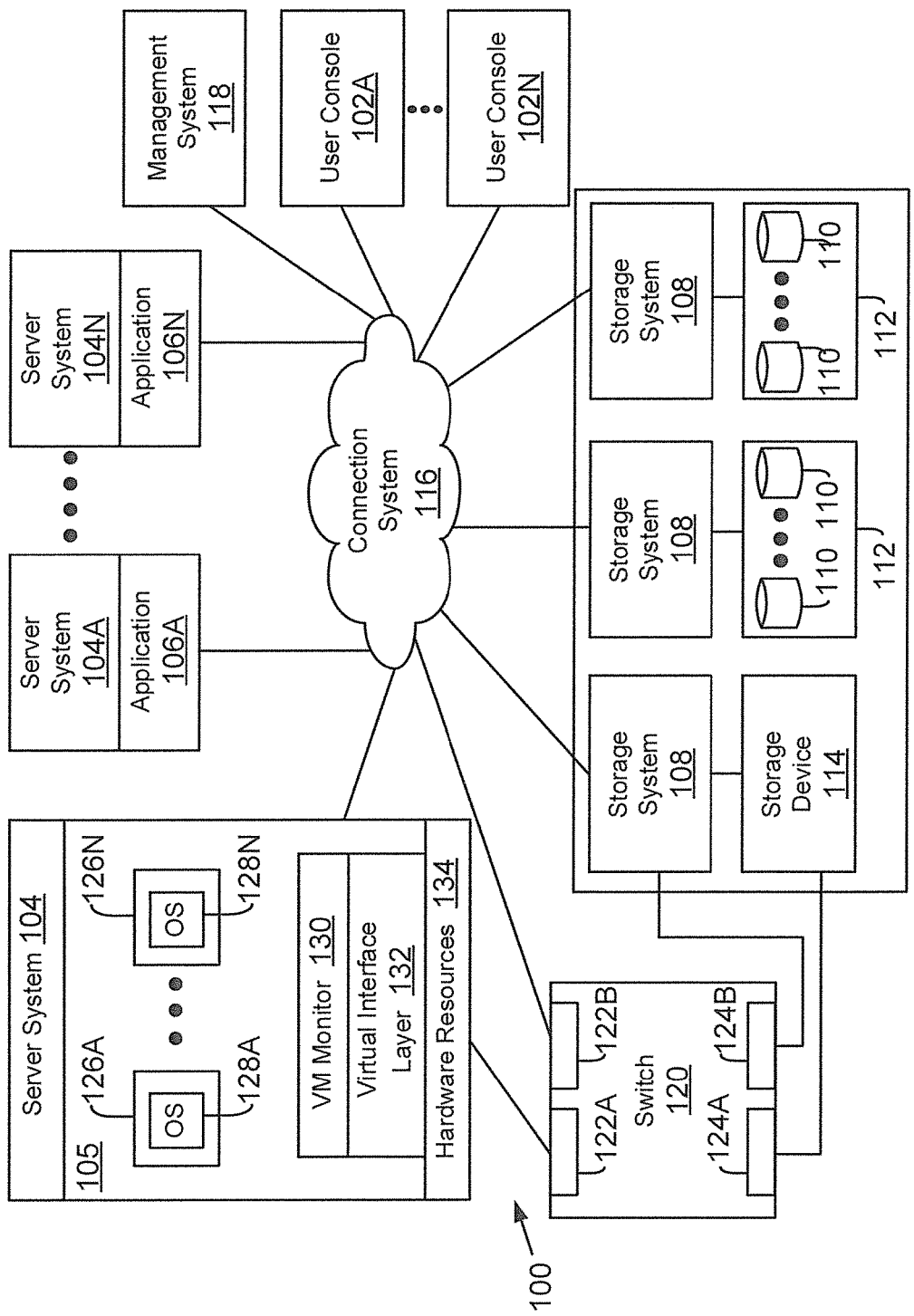
FIG. 1A shows an example of an operating environment for the various aspects disclosed herein.

System 100:

FIG. 1A shows an example of a networked operating environment 100 (also referred to as system 100), for implementing the various adaptive aspects of the present disclosure. In one aspect, system 100 may include a plurality of computing systems 104A-104N (may also be referred to and shown as server system 104 or as host system 104) that may access one or more storage systems 108 via a connection system 116 such as a local area network (LAN), wide area network (WAN), the Internet and others. The server systems 104 may communicate with each other via connection system 116, for example, for working collectively to provide data-access service to user consoles 102A-102N (may be referred to as user 102).

In one aspect, in a SAN environment, one or more switch 120 may be used for communication between server systems 104 and storage device(s) 114. The switch may include a plurality of ports 122A/122B and 124A/124B, having logic and circuitry for handling network packets. Port 122A is coupled to server system 104, port 122B is coupled to the network 116, while ports 124A/124B may be coupled to storage server 108 and storage device 114, respectively.

Server systems 104 may be computing devices configured to execute applications 106A-106N (referred to as application 106 or applications 106) over a variety of operating systems, including the UNIX® and Microsoft Windows® operating systems. Applications 106 may utilize data services of storage system 108 to access, store, and manage data in a set of storage devices 110/114 that are described below in detail. Applications 106 may include an email exchange application, a database application or any other type of application. In another aspect, application 106 may comprise a virtual machine as described below in more detail.

Server systems 104 generally utilize file-based access protocols when accessing information (in the form of files and directories) over a network attached storage (NAS)-based network. Alternatively, server systems 104 may use block-based access protocols, for example, the Small Computer Systems Interface (SCSI) protocol encapsulated over TCP (iSCSI) and SCSI encapsulated over Fibre Channel (FCP) to access storage via a storage area network (SAN).

Server 104 may also execute a virtual machine environment 105, according to one aspect. In the virtual machine environment 105 a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

The virtual execution environment 105 executes a plurality of VMs 126A-126N. VMs 126A-126A execute a plurality of guest OS 128A-128N (may also be referred to as guest OS 128) that share hardware resources 134. As described above, hardware resources 134 may include CPU, memory, I/O devices, storage or any other hardware resource.

A virtual machine monitor (VMM) 130, for example, a processor executed hypervisor layer provided by VMWare Inc., Hyper-V layer provided by Microsoft Corporation (without derogation of any third party trademark rights) or any other layer type, presents and manages the plurality of guest OS 128a-128n. VMM 130 may include or interface with a virtualization layer (VIL) 132 that provides one or more virtualized hardware resource 134 to each guest OS. For example, VIL 132 presents physical storage at storage devices 110/114 as virtual storage (for example, as a virtual hard drive (VHD)) to VMs 126A-126N. The VMs use the VHDs to store information at storage devices 110 and 114.

In one aspect, VMM 130 is executed by server system 104 with VMs 126A-126N. In another aspect, VMM 130 may be executed by an independent stand-alone computing system, often referred to as a hypervisor server or VMM server and VMs 126A-126N are presented via another computing system. It is noteworthy that various vendors provide virtualization environments, for example, VMware Corporation, Microsoft Corporation (without derogation of any third party trademark rights) and others. The generic virtualization environment described above with respect to FIG. 1A may be customized depending on the virtual environment provider.

System 100 may also include a management system 118 for managing and configuring various elements of system 100. Management system 118 may include one or more computing systems for performing various tasks described below in detail. Details regarding management system 118 are provided below in more detail.

System 100 may also include one or more user consoles 102A-102N referred to as users. Users' 102A-102N may access server system 104 for storage related services provided by storage system 108 and also use management system 118 for obtaining management related services described below in detail.

In one aspect, storage system 108 has access to a set of mass storage devices 110 (may be referred to as storage devices 110) within a storage subsystem 112. Storage system 108 may also access storage devices 114 via switch 120 that may be a Fibre Channel, Fibre Channel over Ethernet or any other type of switch. Storage devices 110 and 114 are referenced interchangeably throughout this specification. As an example, storage devices 110 and 114 may be a part of a storage array within the storage sub-system.

Storage devices 110/114 are used by storage system 108 for storing information. The storage devices 110/114 may include writable storage device media such as magnetic disks, video tape, optical, DVD, magnetic tape, non-volatile memory devices for example, self-encrypting drives, flash memory devices and any other similar media adapted to store information. The storage devices 110/114 may be organized as one or more groups of Redundant Array of Independent (or Inexpensive) Disks (RAID). The aspects disclosed herein are not limited to any particular storage device or storage device configuration.

In one aspect, to facilitate access to storage devices 110/114, a storage operating system of storage system 108 "virtualizes" the storage space provided by storage devices 110/114. The storage system 108 can present or export data stored at storage devices 110/114 to server systems 104 and VMM 130 as a storage volume or one or more qtree sub-volume units. Each storage volume may be configured to store data files (or data containers or data objects), scripts, word processing documents, executable programs, and any other type of structured or unstructured data. From the perspective of the VMS/server systems, each volume can appear to be a single disk drive. However, each volume can represent the storage space in one disk, an aggregate of some or all of the storage space in multiple disks, a RAID group, or any other suitable set of storage space.

It is noteworthy that the term "disk" as used herein is intended to mean any storage device/space and not to limit the adaptive aspects to any particular type of storage device, for example, hard disks.

The storage system 108 may be used to store and manage information at storage devices 114 based on a request generated by server system 104, management system 118, user 102 and/or a VM. The request may be based on file-based access protocols, for example, the CIFS or the NFS protocol, over TCP/IP. Alternatively, the request may use block-based access protocols, for example, iSCSI or FCP.

As an example, in a typical mode of operation, server system 104 (or VMs 126A-126N) transmits one or more input/output (I/O) commands, such as an NFS or CIFS request, over connection system 116 to the storage system 108. Storage system 108 receives the request, issues one or more I/O commands to storage devices 110/114 to read or write the data on behalf of the server system 104, and issues an NFS or CIFS response containing the requested data over the connection system 116 to the respective server system 104

In one aspect, storage system 108 may have a distributed architecture, for example, a cluster based system that may include a separate network module and storage module, described below in detail with respect to FIG. 2A. Briefly, the network module is used to communicate with host platform server system 104 and management system 118, while the storage module is used to communicate with the storage devices 110/114 that are a part of a storage sub-system.

Storage system 108 maintains various data structures for storing information related to storage devices 110/114. For example, storage system 108 is aware of the identity and capabilities of storage device 110/114. Storage system 108 maintains the information regarding all the VMs and server systems that use storage device 110/114. This information may be stored as unique identifiers.

Because storage system 108 services read and write requests, it maintains information regarding the number of I/O operations that are processed within a time unit, for example, a second, referred to herein as "IOPS" by the storage device and by each storage volume. Storage system 108 is also aware of the identity of the server systems that generate the I/O requests. Storage system 108 also maintains information on a rate at which information is transferred (also referred to as a throughput rate) from the storage devices. The throughput rate is maintained for each storage volume of the storages devices.

As shown in FIG. 1A, system 100 has various components that are used to provide storage services. Storage systems and various components may be provided by different vendors that have different attributes and may use different formats for managing information. In conventional systems, a user often has to submit multiple queries to obtain performance and status data regarding the various components. This challenge is further exacerbated because the system uses hardware/software from different vendors. A better solution is provided herein as described below in detail.

Figure 1B:
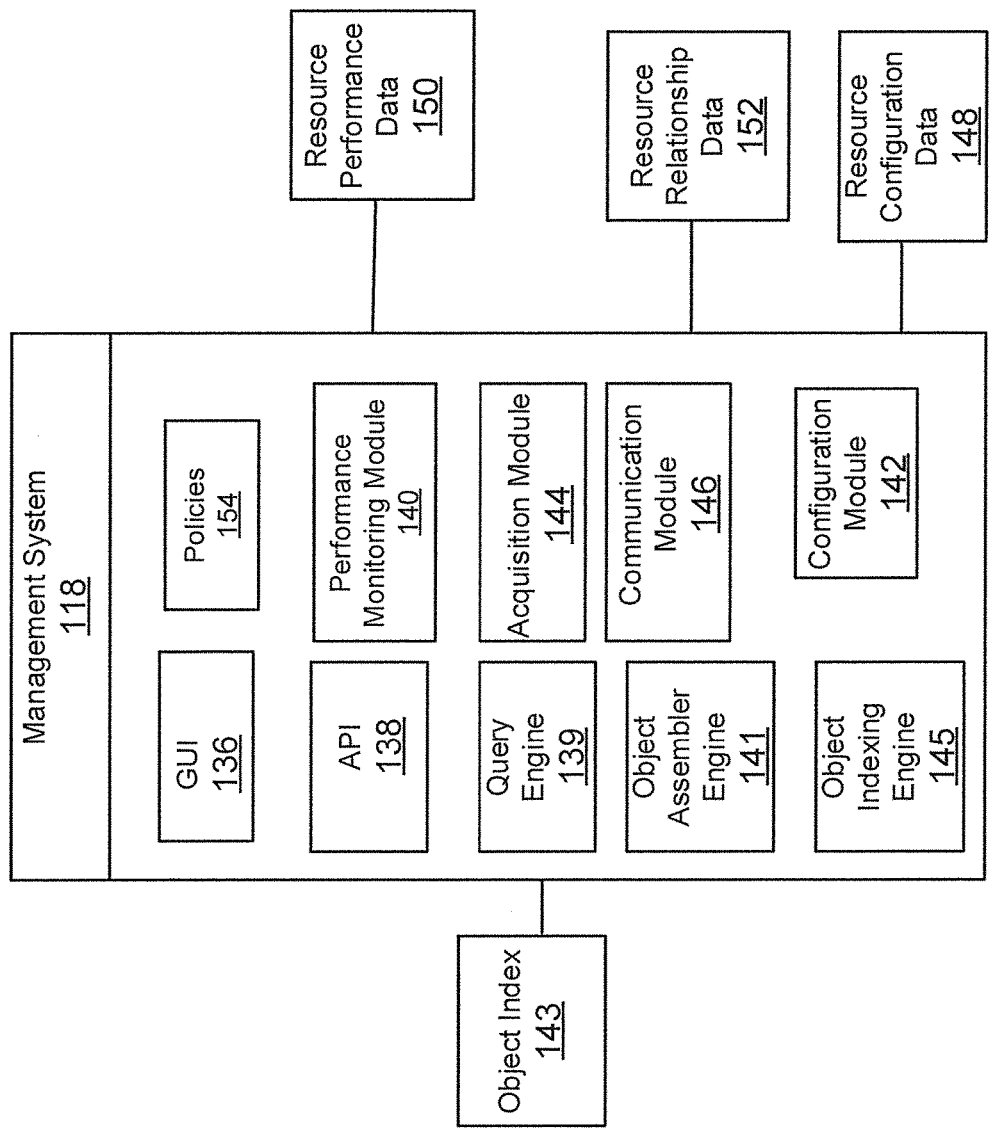
FIG. 1B shows an example of a management system, according to one aspect of the present disclosure.

Management System 118:

FIG. 1B shows a block diagram of management system 118, according to one aspect of the present disclosure. The various modules of management system 118 may be implemented in one computing system or in a distributed environment among multiple computing systems.

In the illustrated aspect, the management system 118 may include a graphical user interface (GUI) module 136 to generate a GUI for use by a storage administrator or a user using a user console 102. In another aspect, management system 118 may present a command line interface (CLI) to a user. The GUI may be used to receive a request or a query for information regarding any resource of system 100.

A user query is provided to an application programming interface (API) module 138 that may be implemented as one or more REST APIs, where REST means "Representational State Transfer". REST is a scalable system used for building web services. REST systems/interface may use HTTP (hyper-text transfer protocol) or other protocols for communicating. The various aspects disclosed herein are not limited to any specific API format.

The user query is provided by the API module 138 to a query engine (also referenced as a query language processing engine) 139 that accesses an object index 143 to obtain one or more object identifiers. The object index is populated by the object indexing engine 145, as described below in detail. The object identifier is provided to an object assembler engine 141 that obtains query related information, assembles the objects and provides the information to the user via API module 138. Details regarding API module 138, query engine 139, object assembler engine 141, object indexing engine 145 and object index 143 are provided below.

Management system 118 may include a communication module 146 that implements one or more conventional network communication protocols and/or APIs to enable the various modules of management system 118 to communicate with the storage system 108, VMs 126A-126N, server system 104 and clients 102.

In one aspect, management system 118 includes an acquisition module 144 that obtains information regarding storage devices 110/114 from storage system 108, the various host systems, switch 120 and other components of system 100 based on policies 154. Acquisition module 144 may send a discovery request to obtain configuration information. The format and structure of the discovery request will depend on the protocol/standard used by acquisition module 144 to communicate with the server systems 104, storage system 108, storage device sub-systems 112 and switch 120.

In one aspect, the acquisition module 144 collects configuration data and performance data regarding various resources, as described below in detail. The configuration data identifies the resource, resource type, connection information, attributes that define the relationship between one resource and another (for example, a volume uses a storage device space, then the configuration information includes information regarding both resources). The nature of the configuration information will depend on the resource type and the function that the resource provides.

The performance data may include an amount of data that is transferred to and from a storage device within a certain duration, a number of IOPS that are serviced by a storage device, the identity of the server systems (also referred to as host systems) that use the storage devices, transfer rates of the switch ports and other information. The performance data is based on a performance metric defined for the resource. The performance metric depends on the resource type. For example, the metric for a switch may be the network connection speed, delay in transmitting data while that for a storage device may be utilization and delay in completing read/write operations.

Management system 118 also includes a processor executable configuration module 142 that stores configuration information for various resources used by system 100, for example, storage system nodes, storage devices, switches and other resources. The configuration information may be stored as data structure 148 described below in detail.

As an example, management system 118 maintains information regarding storage device 110 and 114 at resource configuration data structure 148 to store a name of a storage device manufacturer, a storage device identifier, a maximum number of IOPS that the device can handle and a throughput rate that the storage device is able to support. Relationship data may be stored at data structure 152. In another aspect, data structure 148 and 152 may be integrated.

Resource configuration data 148 also identifies the storage system 108 that manages a storage device, the storage volumes associated with the storage device and the identity of users (for example, server systems 104) that access the storage volumes. This information may be obtained from storage system 108.

Resource configuration data 148, may also identify a switch used by system 100 (not shown), the various ports of switch and the identity of the devices/computing systems that are coupled to the switch. This information is acquired by acquisition module 144 either directly from the resources or any other entity, according to one aspect.

Resource configuration data 148 may also identify the VMM 130, for example, the hypervisor that presents and controls VMs 126A-126N; the various VMs and the resources that are used by the VMs at any given time, for example, VHDs. This information may also be acquired by acquisition module 144 from VMM 130 and storage system 108.

The resource relationship data 152 stores information regarding various resources. An example of the relationships is provided below with respect to FIG. 1C. The relationship data 152 may be populated when a networked storage environment is initialized and updated as components are added or removed.

Management system 118 includes a performance monitoring module (may be referred to as performance module) 140 that receives performance data regarding the various resources of system 100. The resource performance data may be stored at data structure 150. The performance data 150 shows if a storage device is over utilized at a given time, the number of TOPS within certain duration, a throughput within the certain duration, available capacity at any given time and other information. Performance data 150 may also include information regarding the performance of switches, Node CPUs and any other configured resource. The performance data 150 may also store information indicating current utilization and available performance capacity of the resource at any given time. Performance data 150 may also include information regarding the various VMs, identity of the virtual disks used by the VMs and other information.

Management system 118 may also include other modules that are not described in detail because the details are not germane to the inventive aspects.

Figure 1C:
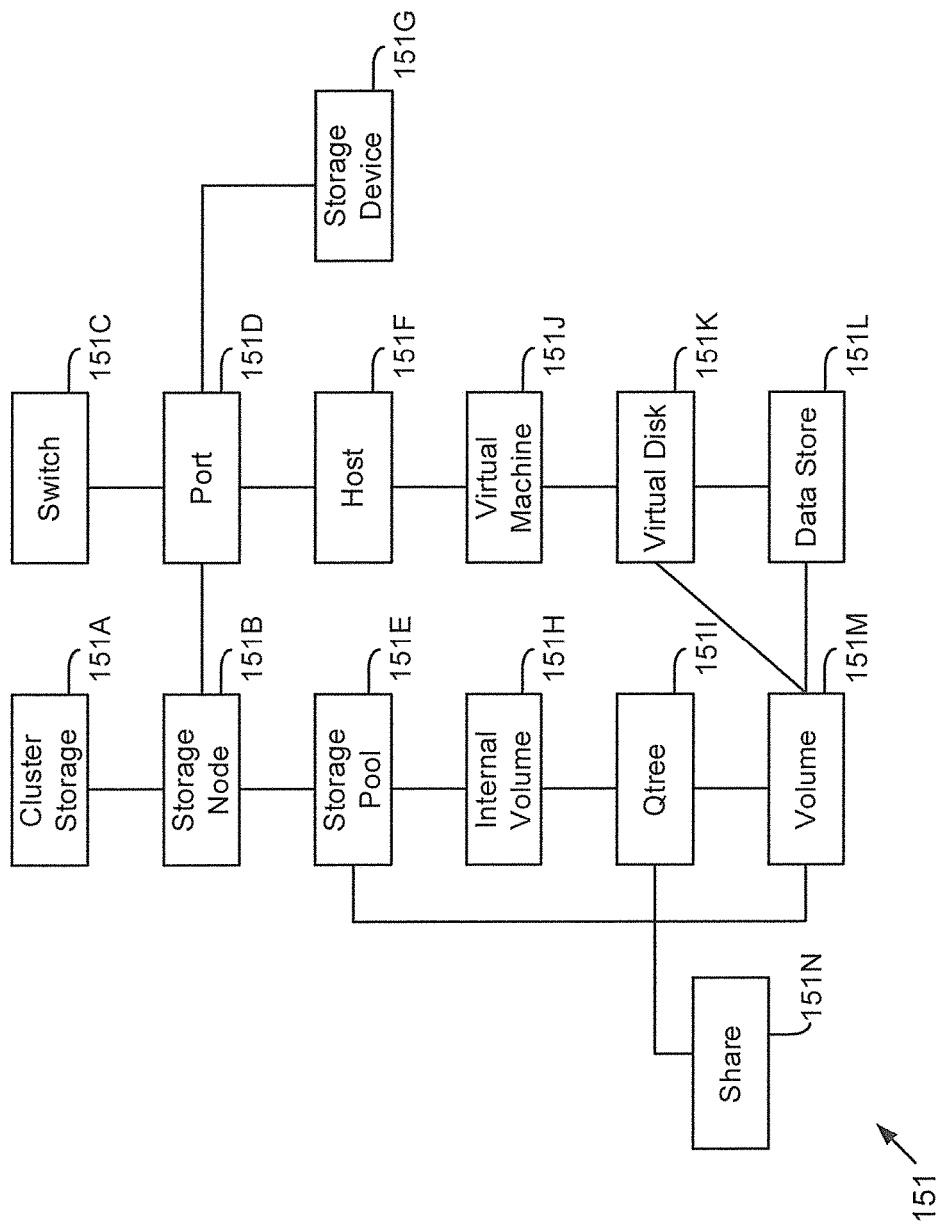
FIG. 1C shows a mesh of resource objects managed by the management system of FIG. 1B.

Object Hierarchy:

FIG. 1C shows an example of a format 151 for tracking information/relationships regarding different resources that are used within storage system 100 and a clustered storage system shown in FIG. 2A and described below in detail. Each resource is represented as an object and is identified by a unique identifier value.

Format 151 maybe a hierarchical mesh where various objects may have parent-child, peer and remote peer relationships, as described below. As an example, format 151 shows a cluster object 151A that may be categorized as a root object type for tracking cluster level resources. The cluster object 151A is associated with various child objects, for example, a storage node object 151B that identifies a storage node within the cluster. The cluster object 151A stores information regarding the cluster, for example, the number of nodes it may have, information identifying the nodes; and any other information.

The storage node object 151B stores information regarding a node, for example, a node identifier and performance data regarding the nodes, for example, CPU utilization of the nodes, latency (i.e. delay) in processing I/O requests, the number of storage volumes the node is managing, and other information.

Each cluster node object 151B may be associated with other objects for example, a storage pool 151E and a port object 151D that is a child of a switch object 151C. The port object 151D is also associated with a storage device object 151G denoting that the port provides access to the storage device.

The storage pool 151E object stores an identifier for identifying a storage pool that may have one or more aggregates associated with one or more storage devices. The storage pool object 151E stores information regarding storage utilization, latency in responding to I/O requests and other information by one or more storage pools.

The storage pool 151E is associated with an internal volume object 151H that is managed by the storage operating system. The internal volume is associated with a Qtree object 151I that in turn is associated with a volume (for example, a LUN) 151M that is presented to a host system or a share (for example, a CIFS share) 151N. The volume 151M may be associated with a data store 151L.

A host system object 151F is used to store information regarding a host and a virtual machine 151J tracks performance/configuration information regarding a virtual machine. The virtual disk object 151K is used to track information regarding a virtual disk. The virtual disk object 151K is also associated with the data store object 151L.

The various objects of FIG. 1C are shown as an example. Other object types may be added based on an operating environment. The performance data and the configuration data including the relationship information between the resources is stored at a storage device, as described below in detail.

Figure 1D:
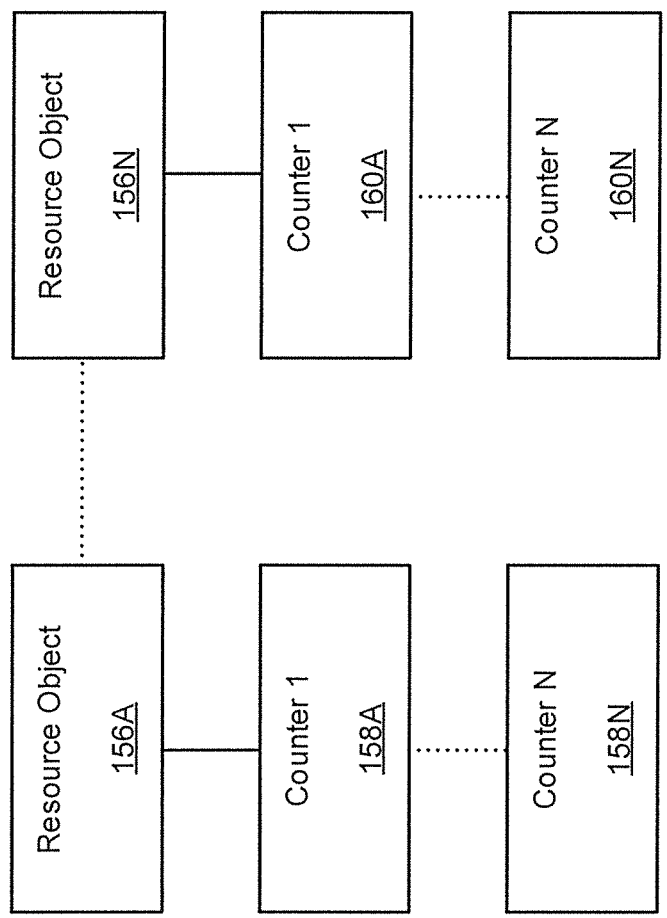
FIG. 1D shows an example of a plurality of resource objects that are managed by the management system of FIG. 1B, according to one aspect of the present disclosure.

FIG. 1D shows an example of how performance data is maintained and collected for various resources, according to one aspect. The various resources maybe assigned to a new workload or an existing workload. As an example, there are may be two types of resources, a service center and a delay center resource. The service center is a resource category that can be represented by a queue with a wait time and a service time (for example, a processor that processes a request out of a queue). The delay center may be a logical representation for a control point where a request stalls waiting for a certain event to occur and hence the delay center represents the delay in request processing. The delay center may be represented by a queue that does not include service time and instead only represents wait time. The distinction between the two resource types is that for a service center, performance data includes a number of visits, wait time per visit and service time per visit. For the delay center, only the number of visits and the wait time per visit at the delay center.

In one aspect, a flow type i.e. a logical view of the resources is used for handling client requests. The flow types include two categories, latency and utilization. A latency flow type is used for analyzing how long operations take at the service and delay centers. The latency flow type is used to identify a workload whose latency has increased beyond a certain level. A typical latency flow may involve writing data to a storage device based on a client request and there is latency involved in writing the data at the storage device. The utilization flow type is used to understand resource consumption of workloads and may be used to identify resource contention.

The various resources of system 100 are represented logically as resource objects 156A-156N (maybe referred to as objects 156). Data associated with the resources is collected using counters shown as 158A-158N and 160A-160N and then stored at performance data structure 150 (FIG. 1B).

Figure 1E:
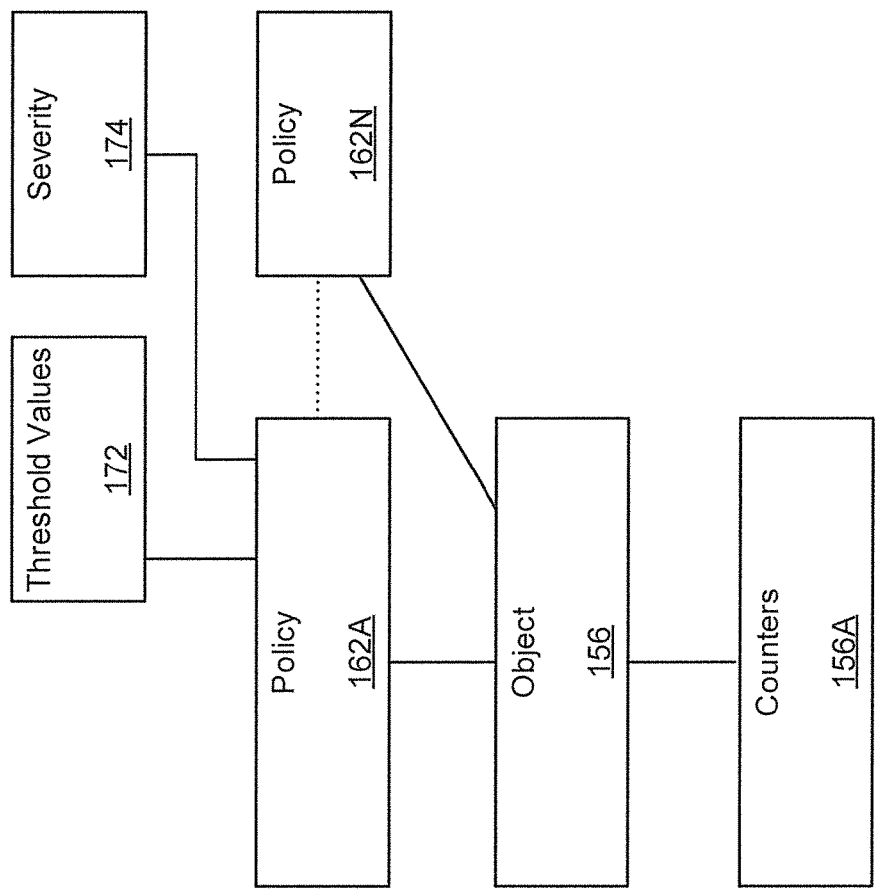
FIG. 1E shows a format for collecting data regarding resources of a networked storage environment, according to one aspect of the present disclosure

FIG. 1E shows an example of how a policy maybe associated with a resource object 156 for collecting performance data, according to one aspect of the present disclosure. Resource object 156 may be associated with one or more policies 162A-162N. Threshold values 172 are assigned to certain parameters for generating alerts and severity 174 defines the importance of an alert, for example, an alert may be critical, or it may only be a warning. Based on the policy, counters 156A are used to collect the appropriate data.

Figure 1F:
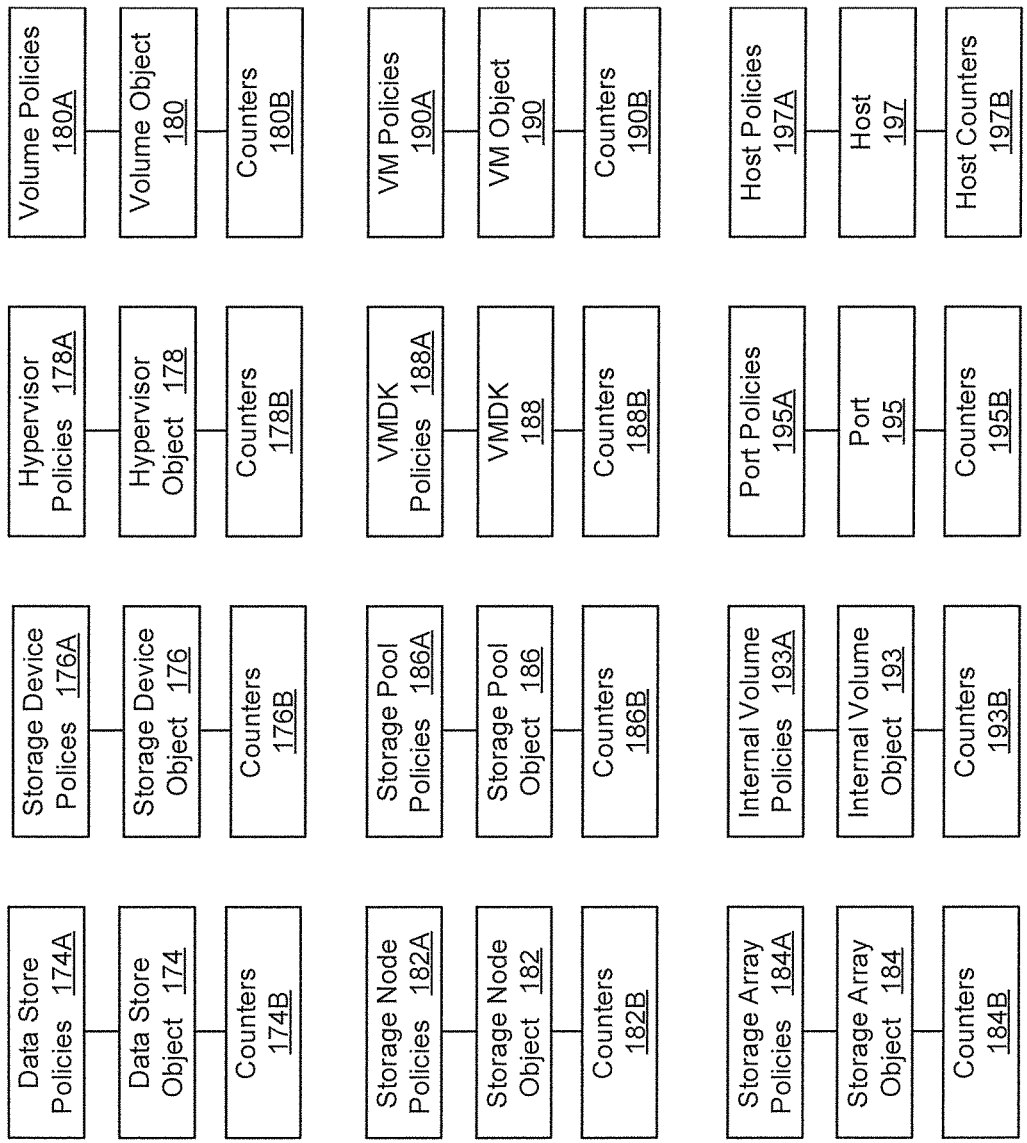
FIG. 1F shows an example of a plurality of objects representing various resources managed according to one aspect of the present disclosure.

FIG. 1F shows an example of various resource objects, similar to FIG. 1C, according to one aspect. For example, resource objects include a data store object 174 with associated data store policies 174A and counters 174B. The data store object 174 is used to track a plurality of virtual disks (VMDKs) that may be used within a VM for storing information.

Resource objects may include a storage device object 176 with storage device policies 176A and counters 176B. The storage device object 176 is used for tracking attributes of different storage devices using counters 176B.

Resource objects may include a hypervisor (or VMM) object 178) object with policies 178A and counters 178B. The hypervisor object 178 is used for tracking attributes of the hypervisor using counters 178B.

Resource objects may include a volume object 180 with policies 180A and counters 180B. The volume object 180 is used for tracking attributes of a volume using counters 180B. The volume object 180 represents a volume that is presented to a host system for storing data.

Resource objects include a storage node object 182 with policies 182A and counters 182B. The storage node object 182 is used for tracking attributes of a storage node using counters 182B, for example node CPU utilization, available capacity of a Node for handling a new workload and other attributes.

Resource objects include storage object (may also be referred to as storage array object) 184 with policies 184A and counters 184B. The storage object 184 is used for tracking attributes of a storage array using counters 184B including used capacity at any given time, available capacity and other attributes.

Resource objects include a storage pool object 186A with policies 186A and counters 186B. The storage pool object 186 is used for tracking attributes of a storage pool (for example, an aggregate having a plurality of storage devices) using counters 186B.

Resource objects include a virtual disk object (VMDK) 188 with policies 188A and counters 188B. The volume object 188 is used for tracking attributes of a VMDK using counters 188B.

Resource objects include a virtual machine object 190 with policies 190A and counters 190B. The virtual machine object 190 is used for tracking attributes of a VM using counters 190B.

Resource objects include an internal volume object 193 with policies 193A and counters 193B. The internal volume object 193 is used for tracking attributes of an internal volume using counters 193B. An internal volume is a logical representation of storage as maintained by a storage operating system.

Resource objects further includes a port object 195 with associated policies 195A and counters 195B. The ports are used to receive and send information.

Resource objects further includes a host system object 197 with associated policies 197A and counters 197B. The host object 197 is used to represent host computing systems, for example, 104.

Table I below shows an example of various counters associated with the resource objects of FIG. 1E that are maintained by the management 118, according to one aspect. The Column Labelled "Object" identifies the resource objects of FIG. 1E. The second column shows the "Counter" associated with the infrastructure object. The third column shows the unit associated with the performance data. For example, the unit MBS means, megabytes per second, KBS means kilobytes per second, IOPS means number of I/O (i.e. read and/or write) operations per second, and the other units that are self-explanatory. The fourth column provides a description of the performance data that is being collected for an object/counter.

TABLE I

| Object | Counter(s) | Unit | Description |
|--------|-----------|------|-------------|
| VOLUME | Read; Write, Total and Maximum Throughput | MBS | Total data transfer for read operations, write operations, read and write and maximum data read and written for the object |
| VOLUME | Read, Write; Total and Maximum Latency | MILLISECONDS | The latency of read operations; write operations; read and write operations and maximum latency for the object |
| VOLUME | Read, Write, Total, Maximum IOPS | IOPS | The number of read; write; read and write and maximum number of read and write request per second |

TABLE I-continued

| Object | Counter(s) | Unit | Description |
|---|---|---|---|
| VOLUME | Total pending write requests | NONE | The number of write requests that are pending at any given time |
| VOLUME | Read; Write; Total Cache Hit Ratio | PERCENTAGE | The percentage of read; write requests and total requests served by a cache of a storage system node |
| VOLUME | Total Partial Blocks Ratio | PERCENTAGE | The percentage of blocks not fully written or read by a node |
| VIRTUAL_MACHINE | Read; Write; Total; and Maximum Disk Throughput | MBS | Total data read; written; read and written; and maximum data read and written for the VM object |
| VIRTUAL_MACHINE | Read; Write; Total; and Maximum Disk Latency | MILLISECONDS | Latency of read; write; read and write; and maximum read and write operations for the VM object |
| VIRTUAL_MACHINE | Read; Write; Total; and Maximum Disk IOPS | IOPS | The number of read; write; read and write requests; and a maximum of read and write requests per second |
| VIRTUAL_MACHINE | Total CPU; and Memory Utilization | PERCENTAGE | The VM CPU; and memory utilization |
| VIRTUAL_MACHINE | Incoming Swap; and Outgoing Swap Rate | KBS | Amount of data swapped between memory and disk for the VM |
| VIRTUAL_DISK | Read; Write; Total; and Maximum Throughput | MBS | Total data read; written; read and written; and maximum data read and written to the object |
| VIRTUAL_DISK | Read; Write; Total; and Maximum Latency | MILLISECONDS | Read; write; read and write operations and maximum latency for read and write operations |
| VIRTUAL_DISK | Read; Write; Total and; Maximum IOPS | IOPS | The number of read; write; total; and maximum number of read and write requests per second |
| STORAGE_POOL | Read; Write; Total and Maximum utilization | PERCENTAGE | The read; write; read and write and maximum utilization of disks in a storage pool |
| STORAGE_POOL | Read; Write; Total and Maximum IOPS | IOPS | The number of read; write; read and write; and maximum read and write requests per second |
| STORAGE_POOL | Read; Write; Total and Maximum Throughput | MBS | Total data read; written; read and written; maximum data read and written for the object |
| STORAGE_NODE | Read; Write; Total and Maximum Throughput | MBS | Total data read; written; read and written and maximum data read and written for the object |
| STORAGE_NODE | Read; Write; Total; and Maximum Latency | MILLISECONDS | Latency due to read; write; read and write and maximum read and write operations for the object |

TABLE I-continued

| Object | Counter(s) | Unit | Description |
|---|---|---|---|
| STORAGE_NODE | Read; Write; Total and Maximum IOPS | IOPS | The number of read; write; read and write and maximum read and write requests per second |
| STORAGE_NODE | Total Replaced Disk Reads | NONE | The number of disk reads replaced by cache |
| STORAGE_NODE | Total and Maximum Utilization | PERCENTAGE | The total and maximum disk utilization of a storage node |
| STORAGE_NODE | Total Port Utilization | PERCENTAGE | The total port utilization at the storage node |
| STORAGE_NODE | Total Cache Hit Ratio | PERCENTAGE | Ratio of IO requests served by a cache for a node |
| STORAGE_NODE | Total Port Errors | NONE | The number of port errors for a storage array |
| STORAGE_NODE | Total Port Traffic | MBS | Total data read and written to the object |
| STORAGE ARRAY | Read; Write; Total and Maximum Throughput | MBS | Total data read; written; read and written and maximum data read and written for the object |
| STORAGE ARRAY | Read; Write; Total and Maximum Latency | MILLISECONDS | Latency of read; write; read and write operations; and maximum latency |
| STORAGE ARRAY | Read; Write; Total and Maximum IOPS | IOPS | The number of read; write; read and write; and maximum read and write requests per second |
| STORAGE ARRAY | Total pending write requests | NONE | The number of write requests queued for a storage array |
| STORAGE ARRAY | Read; Write and Total Cache Hit Ratio | PERCENTAGE | The percentage of read; write; and total requests served by a cache |
| STORAGE ARRAY | Total Partial Blocks Ratio | PERCENTAGE | The ratio of partially written blocks |
| STORAGE ARRAY | Total Cache Utilization | PERCENTAGE | The cache utilization for a storage array |
| HOST | Read; Write; Total and Maximum Disk Throughput | MBS | Data read; written; read and written and maximum data read and written for the object |
| HOST | Disk Read; Write Latency; Total and Maximum Latency | MILLISECONDS | Read; write; total and maximum latency for the object |
| HOST | Disk Read; Write; Total and Maximum IOPS | IOPS | The number of read; write; total and maximum requests per second |
| HOST | Total CPU; Memory Utilization | PERCENTAGE | The CPU and memory utilization of a host CPU |
| DISK | Read; Write; Total and Maximum Throughput | MBS | Data read; written; read and written and maximum data read and written for the object |
| DISK | Read; Write; Total and Maximum Utilization | PERCENTAGE | The read; write; total and maximum utilization of the disks |
| DISK | Read; Write; Total and Maximum IOPS | IOPS | The number of read; write; total and maximum requests per second |
| DATA_STORE | Read; Write; Total and Maximum Throughput | MBS | Data read; written; total and maximum data read and written for the object |

TABLE I-continued

| Object | Counter(s) | Unit | Description |
| --- | --- | --- | --- |
| DATA_STORE | Read; Write; Total and Maximum Latency | MILLISECONDS | Read, write, total and maximum latency for the object |
| DATA_STORE | Read; Write; Total and Maximum IOPS | IOPS | The number of read; write; total and maximum requests per second |

Figure 1G:
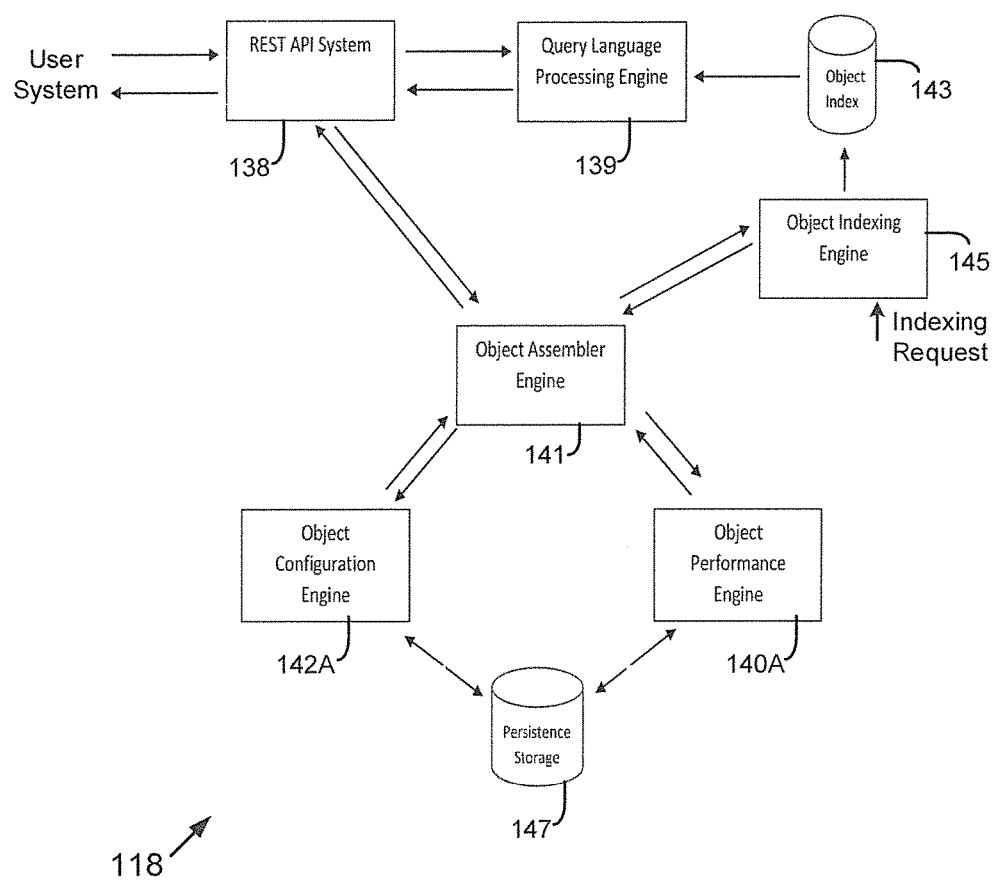
FIG. 1G shows an example of a system for responding to user queries for information regarding resources, according to one aspect of the present disclosure.

FIG. 1G shows a functional block diagram of the management system 100 that is used to index object performance data and object relationship data according to one aspect of the present disclosure. Object indexing engine 145 receives a request to create the object index 143. The object indexing engine 145 provides object identifiers to the object assembler engine 141. The object assembler engine uses an object configuration engine 142A to retrieve configuration data from persistent storage 147 and the object performance engine 140A retrieves the performance data from the persistent storage 147 and assembles object for the object indexing engine 145. The assembled objects include the relationship information of the objects with other resource objects. The object identifiers and the relationship information is then stored at the object index 143. In one aspect, the object index 143 is stored at a memory cache of the management system so that object identifiers can be retrieved immediately upon user requests. The configuration and performance data is stored at the persistent storage 147 and can be retrieved when needed.

In one aspect, when a user sends a request for information, the REST API 138 forwards the user query to the query processing engine 139. The query processing engine 139 obtains the object identifiers from the object index 143. The object identifiers are provided to the REST API module 138 that provides the object identifiers to the object assembler engine 141. The object assembler engine 141 then retrieves the configuration, performance and object relationship data from persistent storage 147, assembles the information with the relationship data and provides the objects and the related information to the REST API module 138. The object state is then provided to the requestor. Details regarding the processes using the various modules of FIG. 1G are described below, after a clustered storage environment is described.

Figure 2A:
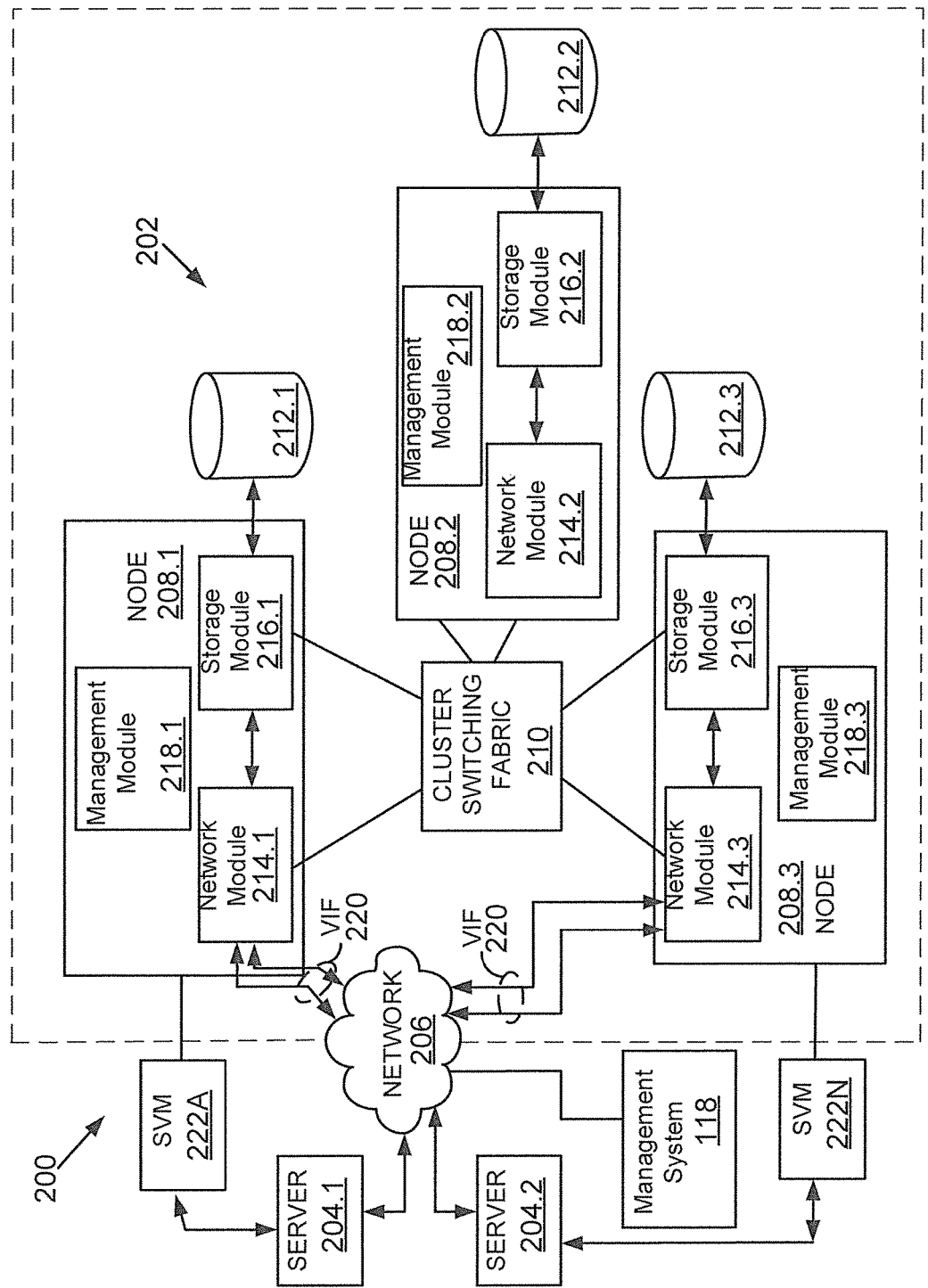
FIG. 2A shows an example of a clustered storage system, according to one aspect of the present disclosure.

Clustered Storage System:

FIG. 2A depicts an illustrative aspect of a storage environment 200 including a plurality of server systems 204.1-204.2 (similar to server systems 104), a clustered storage system 202 and at least one computer network 206 communicably connecting the server systems 204.1-204.2 and the clustered storage system 202. Management system 118 is used to collect information from various cluster nodes as described above in detail.

As shown in FIG. 2A, the clustered storage system 202 includes a plurality of nodes 208.1-208.3, a cluster switching fabric 210, and a plurality of mass storage devices 212.1-212.3 (similar to 110/114, FIG. 1A). Each of the plurality of nodes 208.1-208.3 is configured to include a network module, a storage module, and a management module, each of which can be implemented as a separate processor executable or machine implemented module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enables the respective nodes 208.1-208.3 to connect to one or more of the client systems 204.1-204.2 over the computer network 206, while the storage modules 216.1-216.3 connect to one or more of the storage devices 212.1-212.3.

The management modules 218.1-218.3 provide management functions for the clustered storage system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective network modules 214.1-214.3 and the client systems 204.1-204.2, allowing storage 212.1-212.3 associated with the nodes 208.1-208.3 to be presented to the client systems 204.1-204.2 as a single shared storage pool. For example, the switched virtualization layer may implement a virtual interface architecture. FIG. 2A depicts only the VIFs 220 at the interfaces to the network modules 214.1, 214.3 for clarity of illustration.

The clustered storage system 202 can be organized into any suitable number of virtual servers (VServer or storage virtual machines (SVM)) 222A-222N, in which each virtual storage system represents a single storage system namespace with separate network access. Each virtual storage system has a user domain and a security domain that are separate from the user and security domains of other virtual storage systems. Server systems 204 can access storage space via a VServer from any node of the clustered system 202.

Each of the nodes 208.1-208.3 may be defined as a computer adapted to provide application services to one or more of the client systems 204.1-204.2. In this context, a VServer is an instance of an application service provided to a client system. The nodes 208.1-208.3 are interconnected by the switching fabric 210, which, for example, may be embodied as a Gigabit Ethernet switch or any other switch type.

Although FIG. 2A depicts three network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules.

The server systems 204.1-204.2 of FIG. 2A may be implemented as computing devices configured to interact with the respective nodes 208.1-208.3 in accordance with a client/server model of information delivery. In the presently disclosed aspect, the interaction between the server systems 204.1-204.2 and the nodes 208.1-208.3 enable the provision of network data storage services. Specifically, each server system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The server systems 204.1-204.2 may issue packets according to file-based access protocols, such as the NFS or CIFS protocol, when accessing information in the form of files and directories.

In a typical mode of operation, one of the server systems 204.1-204.2 transmits an NFS or CIFS request for data to one of the nodes 208.1-208.3 within the clustered storage system 202, and the VIF 220 associated with the respective node receives the client request. It is noted that each VIF 220 within the clustered system 202 is a network endpoint having an associated IP address. The server request typically includes a file handle for a data file stored in a specified volume on at storage 212.1-212.3.

Figure 2B:
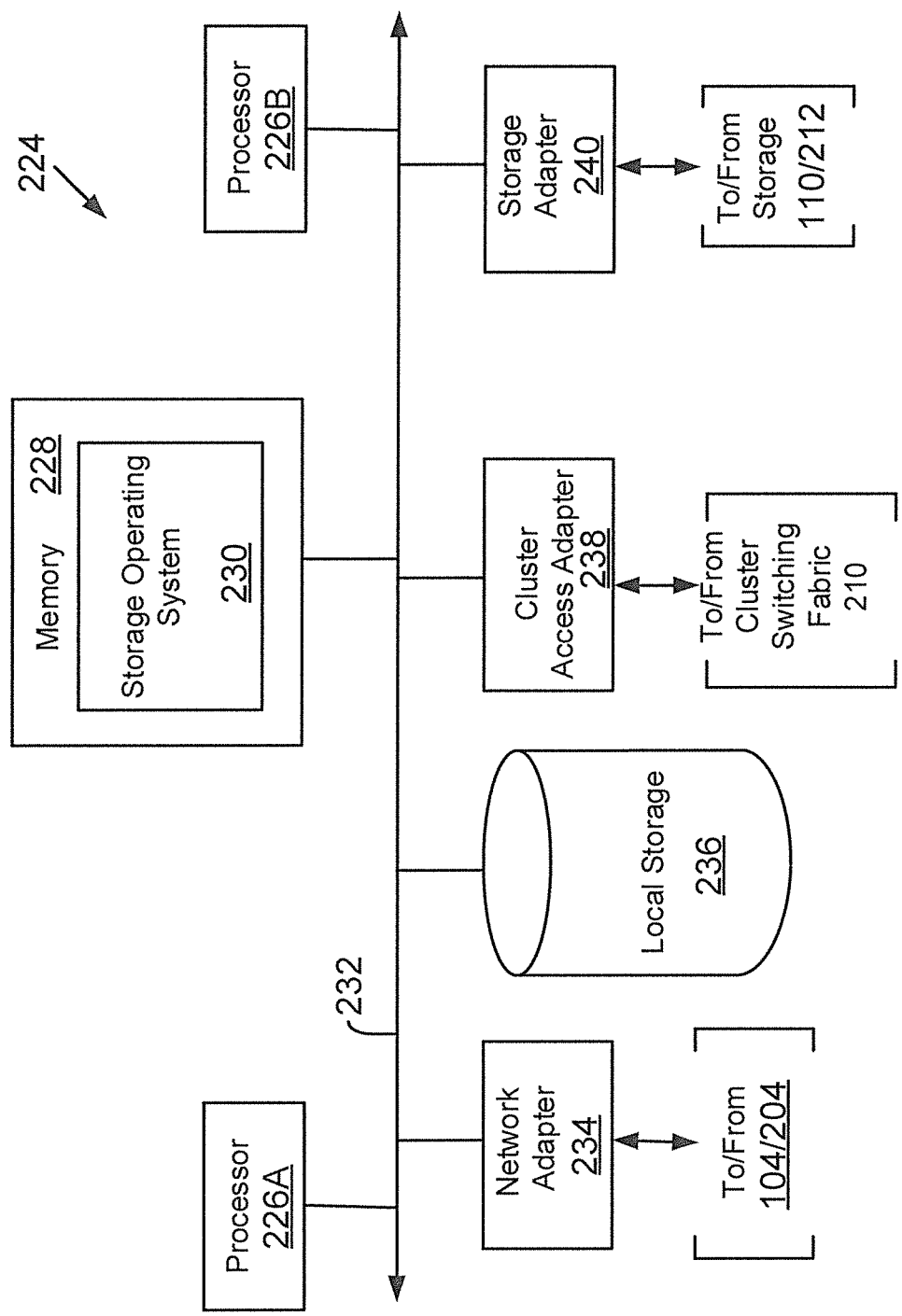
FIG. 2B shows an example of a storage system node, used according to one aspect of the present disclosure.

Storage System Node:

FIG. 2B is a block diagram of a computing system 224, according to one aspect. System 224 may be used by a stand-alone storage system 108 and/or a storage system node operating within a cluster based storage system described above with respect to FIG. 2A.

System 224 may include a plurality of processors 226A and 226B, a memory 228, a network adapter 234, a cluster access adapter 238 (used for a cluster environment), a storage adapter 240 and local storage 236 interconnected by a system bus 232. The local storage 236 comprises one or more storage devices, such as disks, utilized by the processors to locally store configuration and other information, including performance data that is provided to the management system 118.

The cluster access adapter 238 comprises a plurality of ports adapted to couple system 224 to other nodes of a cluster as described above with respect to FIG. 2A. In the illustrative aspect, Ethernet may be used as the clustering protocol and interconnect media, although it will be apparent to those skilled in the art that other types of protocols and interconnects may be utilized within the cluster architecture described herein.

System 224 is illustratively embodied as a dual processor storage system executing a storage operating system 230 that preferably implements a high-level module, such as a file system, to logically organize information as a hierarchical structure of named directories, files and special types of files called virtual disks (hereinafter generally "blocks") on storage devices 110/212. However, it will be apparent to those of ordinary skill in the art that the system 224 may alternatively comprise a single or more than two processor systems. Illustratively, one processor 226 executes the functions of a network module on a node, while the other processor 226B executes the functions of a storage module.

The memory 228 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions described herein.

The storage operating system 230, portions of which is typically resident in memory and executed by the processing elements, functionally organizes the system 224 by, inter alia, invoking storage operations in support of the storage service provided by storage system 108. An example of operating system 230 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 234 comprises a plurality of ports adapted to couple the system 224 to one or more server systems over point-to-point links, wide area networks, virtual private networks implemented over a public network (Internet) or a shared local area network. The network adapter 234 thus may comprise the mechanical, electrical and signaling circuitry needed to connect storage system 108 to the network. Illustratively, the computer network may be embodied as an Ethernet network or a FC network.

The storage adapter 240 cooperates with the storage operating system 230 executing on the system 224 to access information requested by the server systems 104 and management system 118 (FIG. 1A). The information may be stored on any type of attached array of writable storage device media such as video tape, optical, DVD, magnetic tape, bubble memory, electronic random access memory, flash memory devices, micro-electro mechanical and any other similar media adapted to store information, including data and parity information.

The storage adapter 240 comprises a plurality of ports having input/output (I/O) interface circuitry that couples to the disks over an I/O interconnect arrangement, such as a conventional high-performance, FC link topology.

In another aspect, instead of using a separate network and storage adapter, a converged adapter is used to process both network and storage traffic.

Figure 3A:
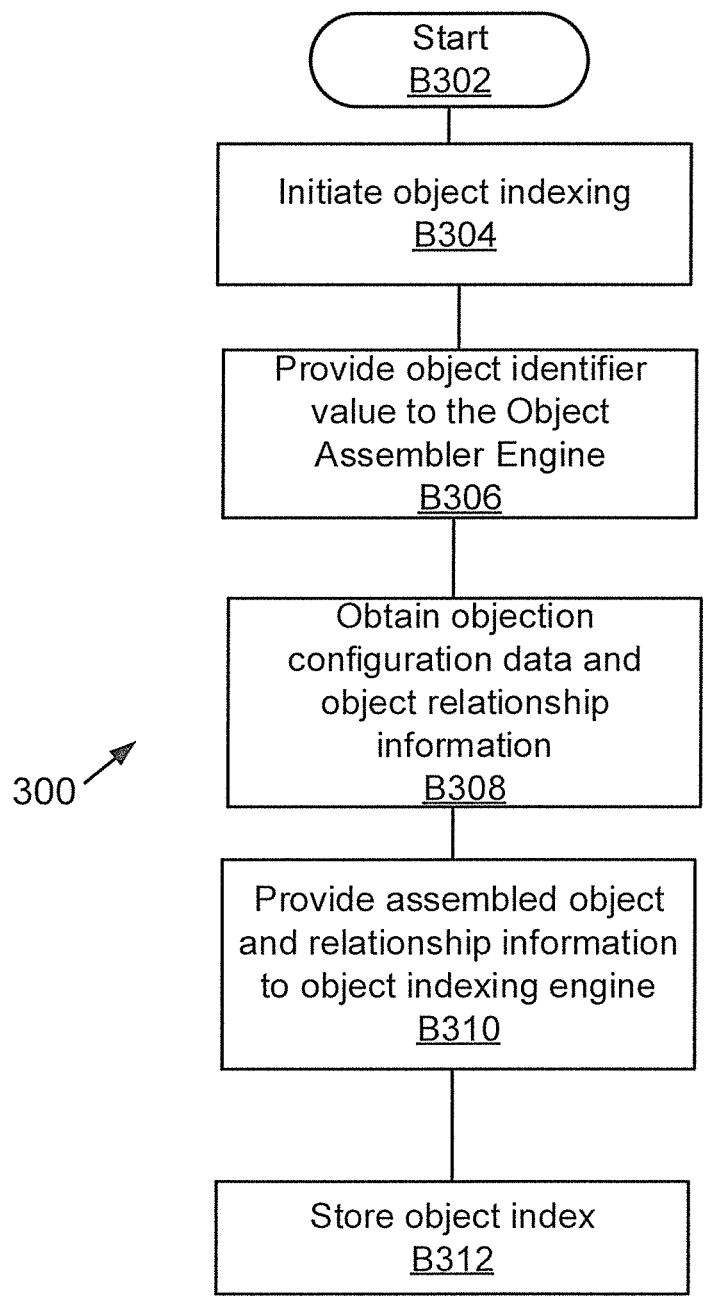
FIG. 3A shows an example of a process for creating an object index, according to one aspect of the present disclosure.

Process Flows:

FIG. 3A shows a process 300 of creating the object index 143, according to one aspect of the present disclosure. The process begins in block B302, when the various resources of cluster 202 may be operational i.e. used for storing data and providing data/status information to one or more host systems. The data is collected using various counters described above in detail.

In block B304, an object indexing operation is initiated when a request to create an index is received by the object indexing engine 145. In block B306, the object indexing engine 145 provides the object assembler engine 141 with a list of object identifiers. The object assembler engine 141 sends a request for configuration data to the object configuration engine 142A and obtains object relation information. This information is then assembled and provided to the object indexing engine 145 in block B310. The object index is then stored in block B312. The object index 143 provides an efficient technique to store object identifiers and the relationship information between various objects. This index can then be used to respond to user queries, as described below with respect to FIGS. 3B/3C.

Figure 3B:
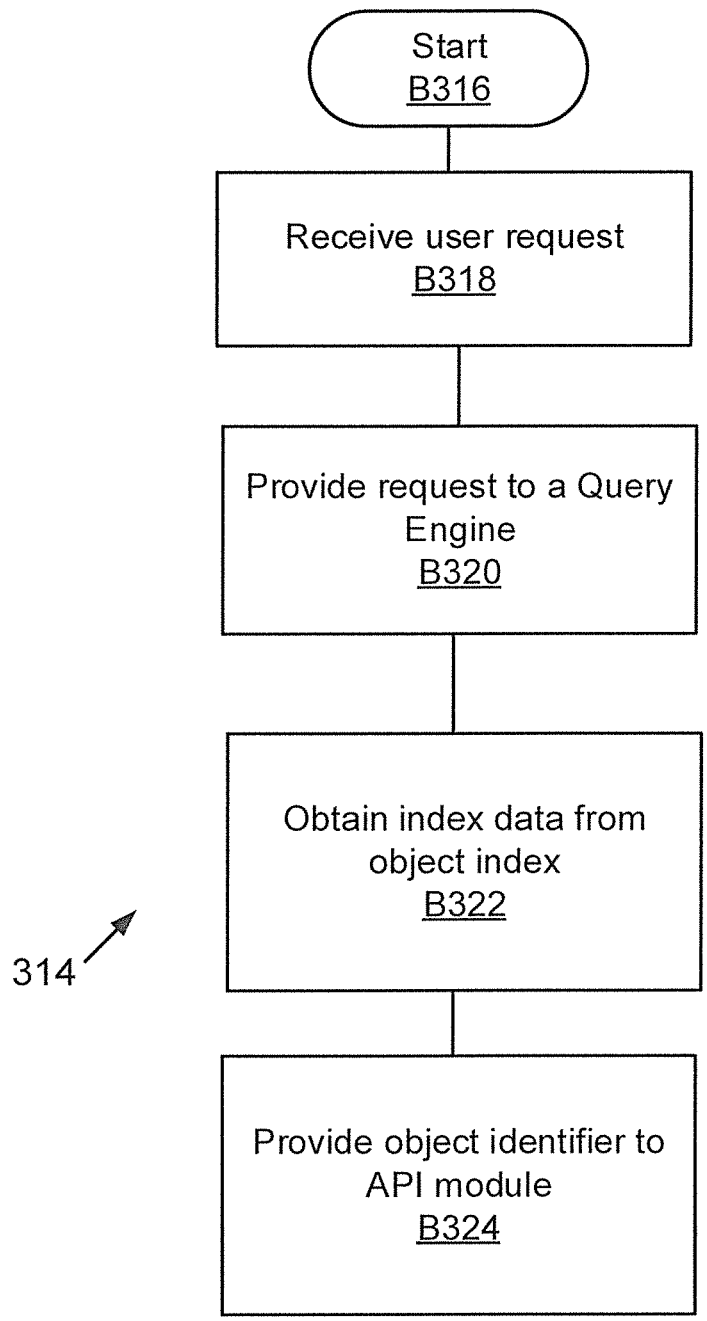
FIG. 3B shows an example of a process for retrieving object identifiers in response to a request for information, according to one aspect of the present disclosure.

FIG. 3B shows a process 314 for retrieving object identifiers from the object index 143 to respond to a user request. As an example, a user request may identify an object type, for example, a volume and provide an expression, for example, identifying a host, an internal volume and performance characteristics range, for example, 75-5000 IOPS and identify an annotated value, for example, identify a data center. In block B318, the API module 138 provides the request to the query language processing engine 139.

In block B320, the query language processing engine 139 extracts indexing information from the object index 143, based on the user query and in block B324, provides the object identifiers to the API module 138.

Figure 3C:
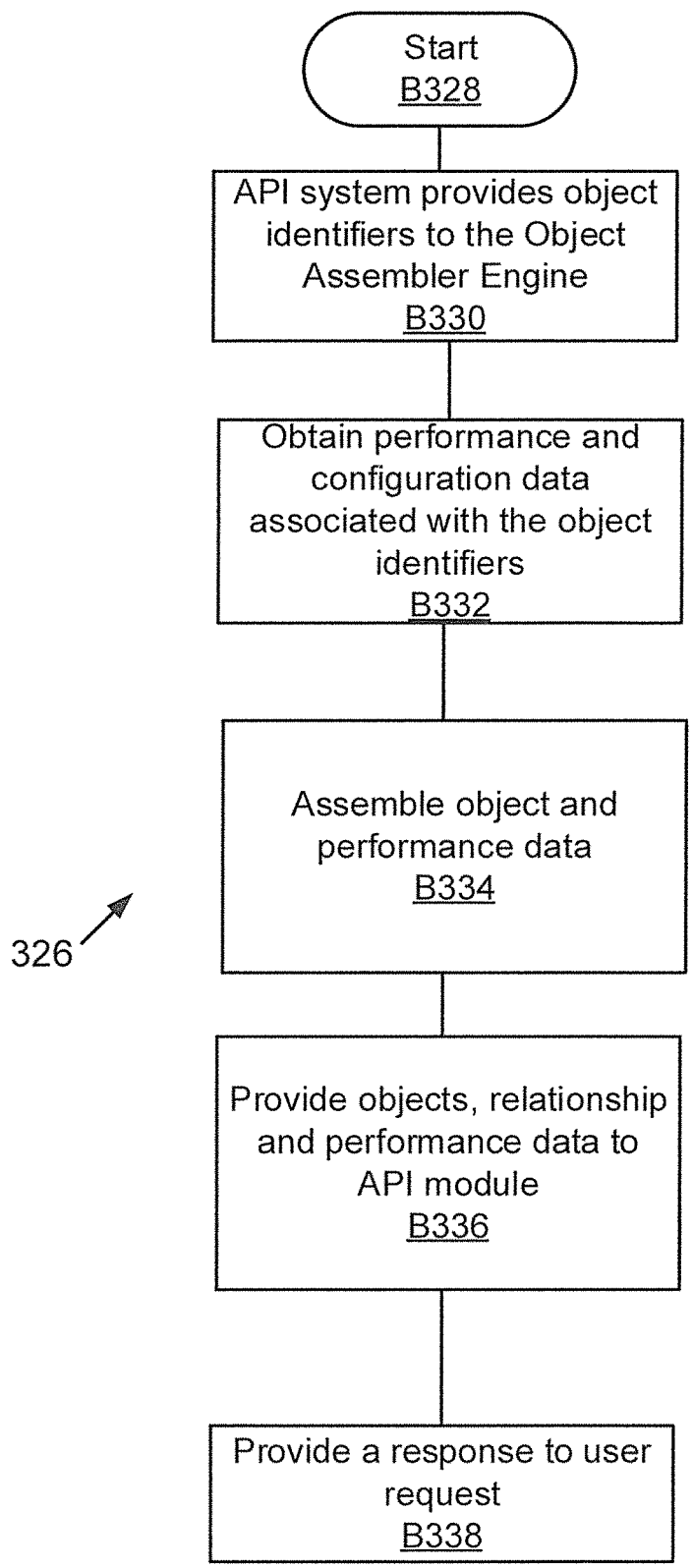
FIG. 3C shows an example of a process for retrieving configuration data and performance data in response to a request for information, according to one aspect of the present disclosure.

FIG. 3C shows process 326 for retrieving an object state, according to one aspect of the present disclosure. The object state not only provides information regarding a specific object/resource but also includes information regarding other related objects. The process begins in block B328 when the REST API module 138 receives the object identifiers from the query language engine 139. In block B330, the object identifiers are provided to the object assembler engine 141. In block B332, the object assembler engine 141 first requests configuration information associated with the object identifiers. The object configuration engine 142A retrieves the configuration/relationship data associated with the object identifiers and provides the configuration/relationship data to the object assembler engine 141. The object assembler engine 141 also requests performance data associated with the object identifiers. The object performance engine 140A retrieves the performance data from storage 147 and provides the performance data to the object assembler engine.

In block B336, the object assembler engine 141 assembles the performance and configuration data and provides the same to the user.

Figure 3D:
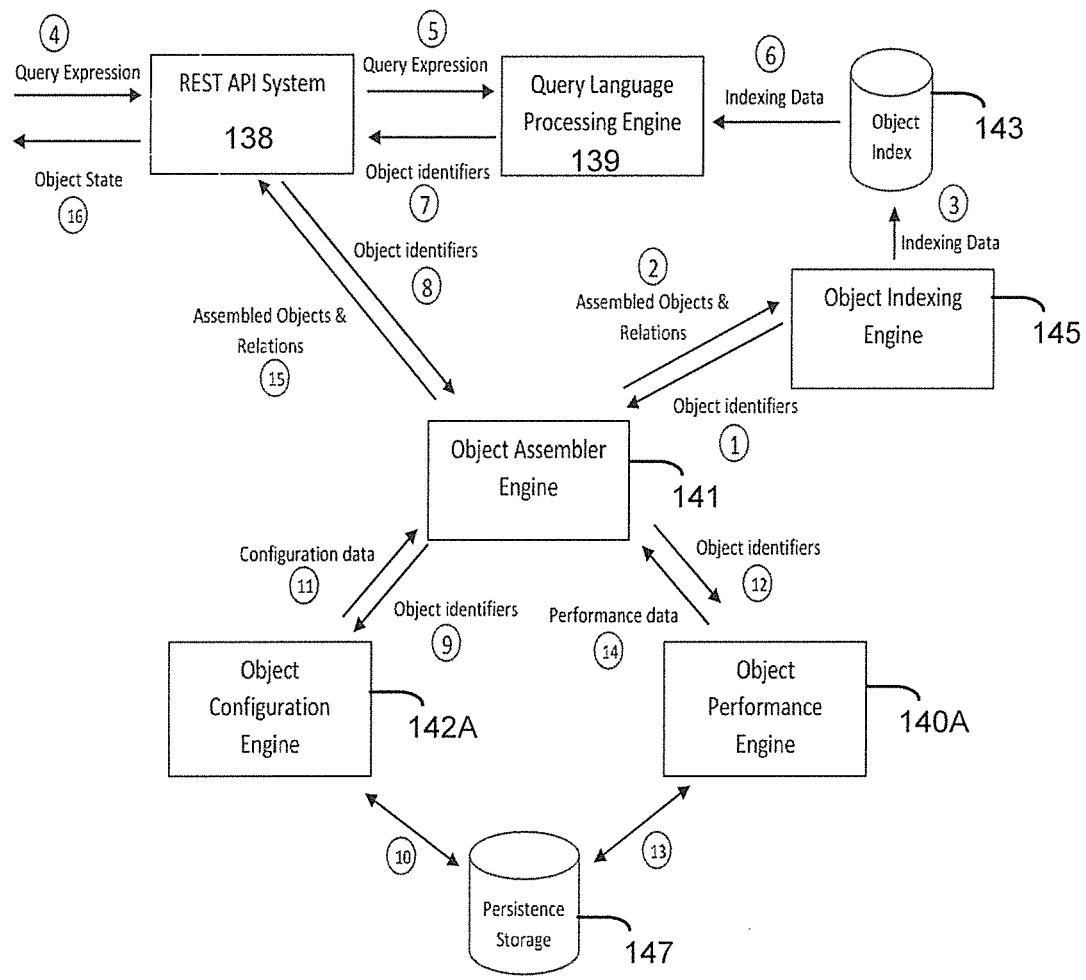
FIG. 3D shows an example depicting the process flows of FIGS. 3A-3C.

FIG. 3D shows an example of the various process blocks of FIGS. 3A-3C to respond to the user requests. The process steps 1-16 are described below:

1. Object Indexing Engine 145 requests object information from Object Assembler Engine 141 and passes Object Identifiers.
2. Object Assembler Engine 145 retrieves object information, passes back Assembled Objects and Relations to Object Indexing Engine 145.
3. Object Indexing Engine 145 stores indexing information into Object Index 143.
4. Query Language request comes in into REST API System 138.
5. REST API System 138 passes in query language expression to Query Language Processing Engine 139.
6. Query Language Processing Engine 139 retrieves indexing information from Object Index 143 and processes the query.
7. Query Language Processing Engine 139 retrieves object identifiers and provides them to REST API system 138.
8. REST API system 138 requests assembled object information from Object Assembler Engine 141 and provides the object identifiers.
9. Object Assembler Engine 141 requests configuration data from the Object Configuration Engine 142A and provides the object identifiers.
10. Object Configuration Engine 142A interacts with persistent storage 147 to retrieve appropriate configuration/relationship data.
11. Object Configuration Engine 142A assembles and returns configuration data to Object Assembler Engine 141.
12. Object Assembler Engine 141 requests performance data from the Object Performance Engine 140A and provides object identifiers.
13. Object Performance Engine 140A interacts with persistent storage 147 to retrieve appropriate performance data.
14. Object Performance Engine 140A assembles and returns performance data to Object Assembler Engine 141.
15. Object Assembler Engine 141 puts together configuration and performance data and returns assembled objects to REST API System 138.
16. REST API System 138 performs REST transformation on objects to provide REST API object state back to the requester.

As an example, assume that a following user query is received by REST API 138:

Object Type:volume AND expression=computerResources.name:"Host1" AND internal volume.name:"Internalvolume1" and performance.IOPS: [75-5000] And (annotation values.Data center:Lisboa). This query seeks information regarding host, internal volume 1 with performance IOPS range of 75-5000 at the datacenter called Lisboa.

Figure 3E:
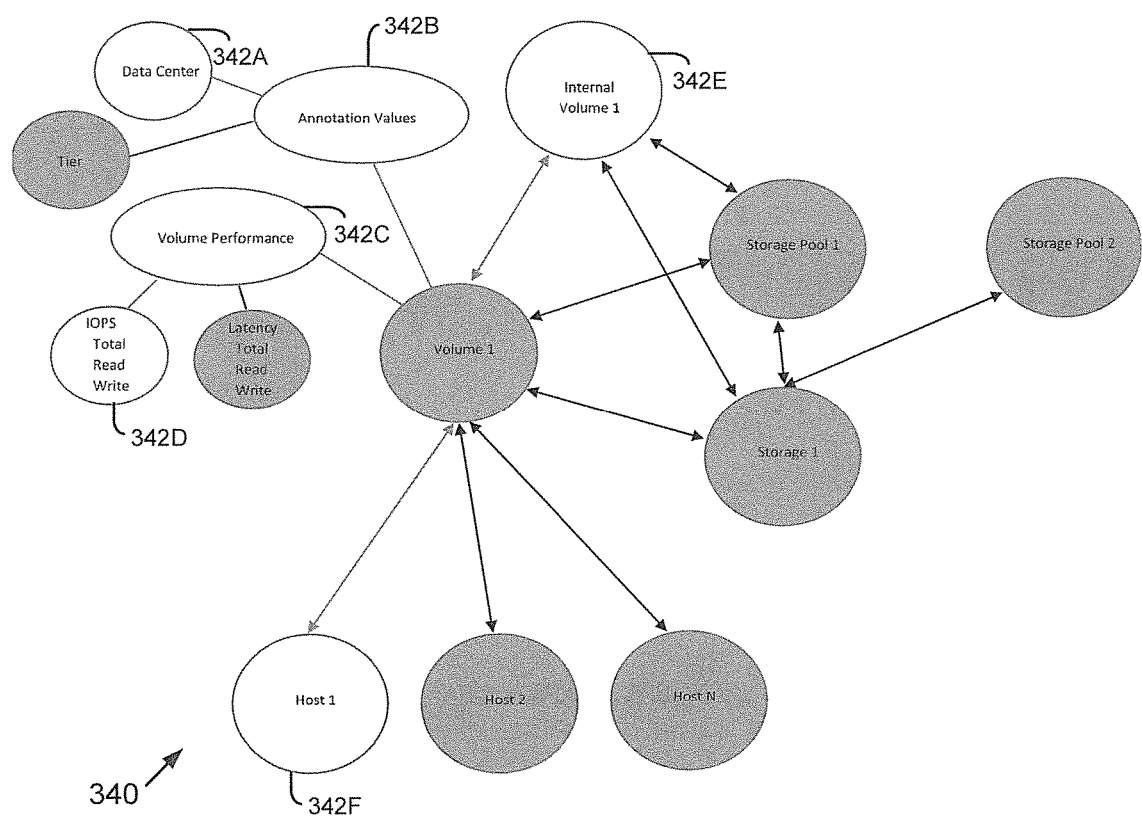
FIG. 3E shows a pictorial example of a response for information, according to one aspect of the present disclosure.

FIG. 3E provides the object state 340 with various objects, including 342A, 342B, 342C, 342D, 342E and 342F. The object with the dark shading and the ones that are not numbered are not provided to the user. An example of the object state for the foregoing query example as a JSON (Javascript Object Notation) object is:

```
{
    "id": "379",
    "self": "/rest/v1/assets/volumes/379",
    "resourceType": "Volume",
    "name": "Volume1|",
    "type": "Volume",
    "capacity": {
        "descrption": "Volume Capacity",
        "unitType": "MB",
        "total": {
            "value": 225280.0
        },
        "used": {
            "value": 225280.0,
            "highThreshold": 90.0
        },
        "isThinProvisioned": false,
    },
    "isThinProvisioned": false,
    "isMainframe": false,
    "virtualizedType": "STANDARD",
    "internalVolume": {
        "id": "3923",
        "self": "/rest/v1/assets/internalvolumes/3929",
        "resourceType": "Internalvolume",
        "name": "Internalvolume1"
    }
    "computeResources":
    [
        {
            "id": "99",
            "self": "/rest/v1/assets/hosts/99",
            "resourceType": "Host",
            "name": "Host1",
```

-continued

```
        "simpleName": "ny_exch2",
        "ip": "192.1.168.1",
        "isHypervisor": false
      }
    ],
    "annotationvalues": {
      "Service Level": "Gold",
      "Data Center": "Lisboa",
      "Tier": "Gold-Fast"
    }
    "performance": {
      "self": "/rest/v1/assets/volumes/379/performance",
      "iops": {
        "performancecategory": "IOPS",
        "description": "IOPS",
        "total": {
          "description": "IOPS – Total",
          "unitType": "IO/S",
          "start": 1433541599999,
          "end": 1434152432612,
          "current": 63.25,
          "min": 5.5,
          "max": 183.5,
          "avg": 82.90625,
          "sum": 13928.25
        }
      }
    }
}
```

In one aspect, the management system 118 use the domain knowledge about object types, their relationships with other objects and creates an efficient object index. The query language processing engine 139 interfaces with the REST API module 138 and based on matches generated from user defined search terms, a REST API JSON response is generated. The user is unaware of the underlying complexity of the various objects/resources and how they may be related.

REST API module 138 is able to retrieve information based on a matching expression including attributes, related object attributes, custom user data, time series values and other information. Matching expression enables partial matching for full text matching, exact matching for enumerable values, range matching for numeric values.

The system and processes described above enable integration with multiple vendor provided resources because the objects are indexed in a uniform standard manner.

Figure 3F:
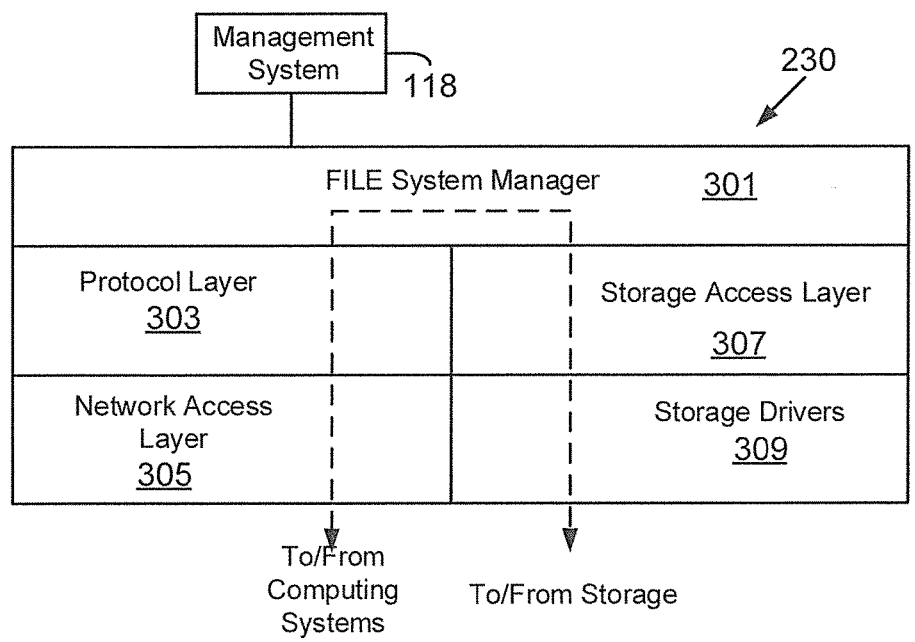
FIG. 3F shows an example of a storage operating system, used according to one aspect of the present disclosure.

Operating System:

FIG. 3F illustrates a generic example of operating system 230 executed by storage system 108, according to one aspect of the present disclosure. Storage operating system 230 interfaces with the management system 118 and provides information for the various data structures maintained by the management system 118, described above in detail.

As an example, operating system 230 may include several modules, or "layers". These layers include a file system manager 303 that keeps track of a directory structure (hierarchy) of the data stored in storage devices and manages read/write operations, i.e. executes read/write operations on disks in response to server system 104 requests.

Operating system 230 may also include a protocol layer 303 and an associated network access layer 305, to allow system 200 to communicate over a network with other systems, such as server system 104 and management system 118. Protocol layer 303 may implement one or more of various higher-level network protocols, such as NFS, CIFS, Hypertext Transfer Protocol (HTTP), TCP/IP and others, as described below.

Network access layer 305 may include one or more drivers, which implement one or more lower-level protocols to communicate over the network, such as Ethernet. Interactions between server systems 104 and mass storage devices 110/114/212 are illustrated schematically as a path, which illustrates the flow of data through operating system 230.

The operating system 230 may also include a storage access layer 307 and an associated storage driver layer 309 to communicate with a storage device. The storage access layer 307 may implement a higher-level disk storage protocol, such as RAID (redundant array of inexpensive disks), while the storage driver layer 309 may implement a lower-level storage device access protocol, such as FC or SCSI.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 108.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

Figure 4:
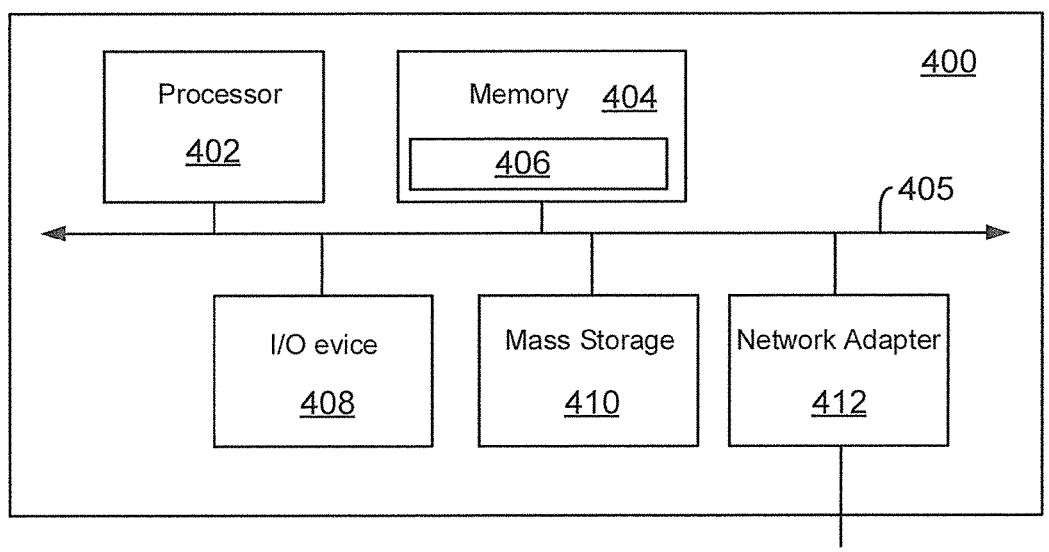
FIG. 4 shows an example of a processing system, used according to one aspect of the present disclosure.

Processing System:

FIG. 4 is a high-level block diagram showing an example of the architecture of a processing system, at a high level, in which executable instructions as described above can be implemented. The processing system 400 can represent modules of management system 118, user console 102, server systems 104 and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code used by the various modules of management system 118 as well as instructions for executing the process blocks of FIGS. 3A-3C.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The management system 118 (and associated methods thereof) and storage systems described above can be a part of the server layer for providing storage services. Details regarding these layers are not germane to the inventive aspects.

Thus, a method and apparatus for managing resources within system 100 have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising: generating an object index by a processor for storing object identifiers for uniquely identifying a plurality of resources represented by a plurality of objects for providing storage services in a networked storage environment, the object index configured to maintain relationship information between the plurality of objects;
receiving a request for information regarding a resource by an application programming interface (API) module executed by the processor;
obtaining by a query engine executed by the processor object identifiers from the object index to respond to the request, where the object identifiers identify a requested object and a related object whose information is stored at the object index, the related object being indicated in the relationship information for the requested object;
providing an object identifier for the requested object and an object identifier for the related object to the API module;
obtaining configuration information and performance data by the processor for the requested object and the related object from a storage device; and
providing information associated with the request object and the related object by the API module; wherein object identifiers are used for generating the object index stored at a cache for faster retrieval than the storage device and the object identifiers are used to assemble information for populating the object index.

2. The method of claim 1, wherein the plurality of resources represented as objects include a storage volume, a storage device, a storage array, a storage pool and a virtual machine.

3. The method of claim 1, wherein the API module provides the object identifier for the requested object and the object identifier for the related object to an object assembler executed by the processor for retrieving the configuration and the performance data from the storage device.

4. The method of claim 3, wherein the object assembler provides object identifiers for generating the object index.

5. The method of claim 4, wherein the processor executes an object indexing engine that provides the object identifiers to the object assembly engine that assembles information for populating the object index.

6. The method of claim 1, wherein the plurality of resources are provided by more than one vendor and the object index stores indexing information regardless of resource type and vendor.

7. The method of claim 1, wherein the performance data identifies a number of input/output operations that have been processed by a resource and a latency in processing operations.

8. A non-transitory, machine-readable storage medium having stored thereon instructions for performing a method, comprising machine executable code which when executed by at least one machine, causes the machine to:
generate an object index by a hardware based processor for storing object identifiers for uniquely identifying a plurality of resources represented by a plurality of objects for providing storage services in a networked storage environment, the object index configured to maintain relationship information between the plurality of objects;
receive a request for information regarding a resource by an application programming interface (API) module executed by the processor;
obtain by a query engine executed by the processor object identifiers from the object index to respond to the request, where the object identifiers identify a requested object and a related object whose information is stored at the object index, the related object being indicated in the relationship information for the requested object;
provide an object identifier for the requested object and an object identifier for the related object to the API module;
obtain configuration information and performance data by the processor for the requested object and the related object from a storage device; and
provide information associated with the request object and the related object by the API module; wherein object identifiers are used for generating the object index stored at a cache for faster retrieval than the storage device and the object identifiers are used to assemble information for populating the object index.

9. The non-transitory storage medium of claim 8, wherein the plurality of resources represented as objects include a storage volume, a storage device, a storage array, a storage pool and a virtual machine.

10. The non-transitory storage medium of claim 8, wherein the API module provides the object identifier for the requested object and the object identifier for the related object to an object assembler executed by the processor for retrieving the configuration and the performance data from the storage device.

11. The non-transitory storage medium of claim 10, wherein the object assembler provides object identifiers for generating the object index.

12. The non-transitory storage medium of claim 11, wherein the processor executes an object indexing engine that provides the object identifiers to the object assembly engine that assembles information for populating the object index.

13. The non-transitory storage medium of claim 8, wherein the plurality of resources are provided by more than one vendor and the object index stores indexing information regardless of resource type and vendor.

14. The non-transitory storage medium of claim 8, wherein the performance data identifies a number of input/output operations that have been processed by a resource and a latency in processing operations.

15. A system, comprising:
a memory containing machine readable medium comprising machine executable code having stored thereon instructions; and a processor module of a management console coupled to the memory, the processor module configured to execute the machine executable code to:
generate an object index for storing object identifiers for uniquely identifying a plurality of resources represented by a plurality of objects for providing storage services in a networked storage environment, the object index configured to maintain relationship information between the plurality of objects;
receive a request for information regarding a resource by an application programming interface (API) module;
obtain by a query engine object identifiers from the object index to respond to the request, where the object identifiers identify a requested object and a related object whose information is stored at the object index, the related object being indicated in the relationship information for the requested object;
provide an object identifier for the requested object and an object identifier for the related object to the API module;
obtain configuration information and performance data by the processor for the requested object and the related object from a storage device; and
provide information associated with the request object and the related object by the API module; wherein object identifiers are used for generating the object index stored at a cache for faster retrieval than the storage device and the object identifiers are used to assemble information for populating the object index.

16. The system of claim 15, wherein the plurality of resources represented as objects include a storage volume, a storage device, a storage array, a storage pool and a virtual machine.

17. The system of claim 15, wherein the API module provides the object identifier for the requested object and the object identifier for the related object to an object assembler executed by the processor for retrieving the configuration and the performance data from the storage device.

18. The system of claim 17, wherein the object assembler provides object identifiers for generating the object index.

19. The system of claim 18, wherein the processor executes an object indexing engine that provides the object identifiers to the object assembly engine that assembles information for populating the object index.

20. The system of claim 15, wherein the plurality of resources are provided by more than one vendor and the object index stores indexing information regardless of resource type and vendor.

\* \* \* \* \*